Oct. 3, 1967 C. H. POTTENGER Re. 26,278
STORAGE STABLE EXPANDABLE POLYMERIC COMPOSITION CONTAINING EXPANDABLE POLYMERIC PARTICLES AND TWO DIFFERENT BLOWING AGENTS AND METHOD OF MAKING SAME
Original Filed April 12, 1960
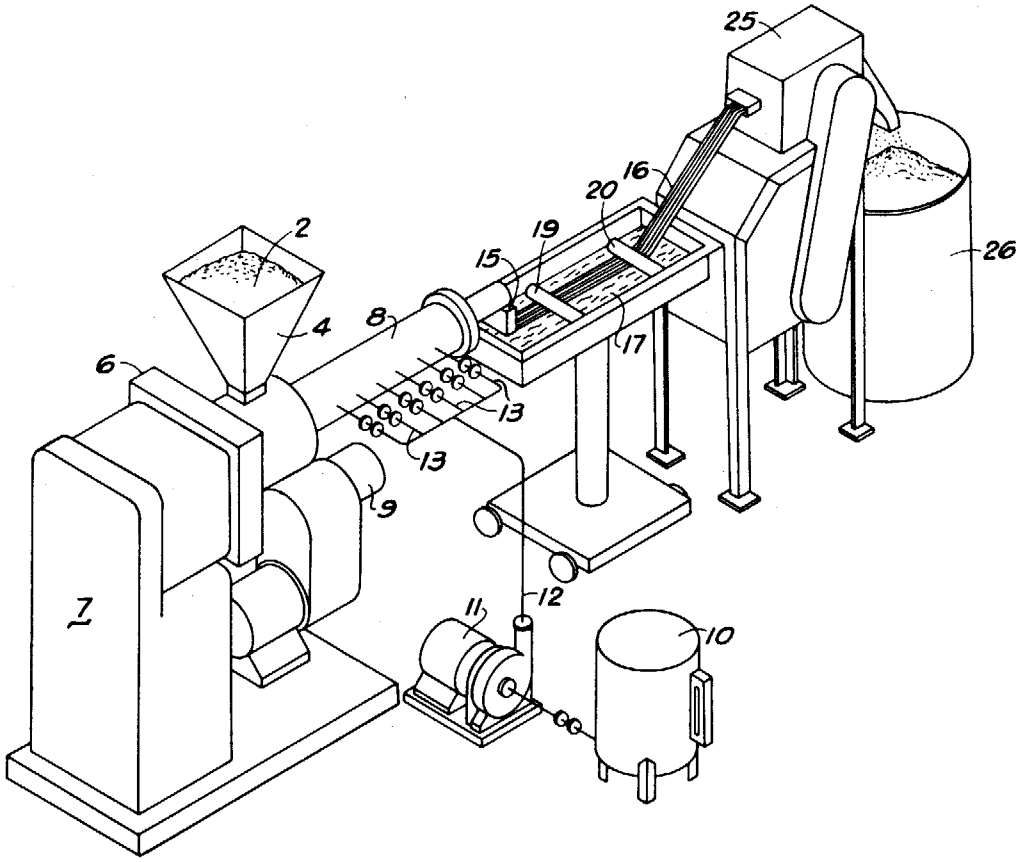
INVENTOR.
CARL H. POTTENGER
BY
Ronald S. Cornell
his ATTORNEY United States Patent Office Re. 26,278
Reissued Oct. 3, 1967

26,278

STORAGE STABLE EXPANDABLE POLYMERIC COMPOSITION CONTAINING EXPANDABLE POLYMERIC PARTICLES AND TWO DIFFERENT BLOWING AGENTS AND METHOD OF MAKING SAME

Carl H. Pottenger, Sewickley, Pa., assignor to Koppers Company, Inc., a corporation of Delaware Original No. 3,089,857, dated May 14, 1963, Ser. No. 21,611, Apr. 12, 1960. Application for reissue, Aug. 17, 1964, Ser. No. 402,674
6 Claims. (Cl. 260—2.5)

Matter enclosed in heavy brackets [ ] appears in the original patent but forms no part of this reissue specification; matter printed in italics indicates the additions made by reissue.

*ABSTRACT OF THE DISCLOSURE*

*Thermoplastic polymer particles, particularly polystyrene particles, which under the influence of heat expand through the action of an aliphatic blowing agent in combination with a blowing agent adjunct comprised of two components, one component being a normally solid acid such as boric acid or organic acids having at least 3 milli-equivalents of acidic hydrogen per gram and the other component being a carbon dioxide liberating agent such as the carbonates and bicarbonates of the alkali and alkaline earth metals, are rendered storage stable by homogeneously incorporating only one of the blowing agent adjunct components in any single one of the polymer particles.*

This invention is concerned with expandable polymers and more particularly with a method of producing storage stable homogeneous expandable polymeric particles, particularly suited for further expansion by extrusion or injection molding.

Foamable polymeric material which can be injection molded or extruded is widely used in the manufacture of such articles as ice buckets, cups, jars, film, toys and novelties. Of the several expandable polymers which are useful in injection molding and extrusion, one of the most widely used is a composition comprising polymeric particles, which particles contain a hydrocarbon blowing agent dispersed throughout. The practice is, particularly when it is desirable to obtain a foam of low density, e.g. 2.5–5 pounds per cubic foot, to add a multi-component blowing agent adjunct such as a combination of materials which under the conditions of extrusion or injection react to yield water and carbon dioxide. Such compositions are described in copending applications Ser. No. 469,306, John C. Houston and John J. Tress, now Patent 2,941,964, and Ser. No. 469,310, Alvin R. Ingram, now Patent 2,941,965, both assigned to the assignee of the present invention.

The multi-component blowing agent adjunct is composed of a carbon dioxide liberating agent and boric acid or an organic acid having at least about 3.0 milliequivalents of acidic hydrogen per gram. The blowing agent is present in amounts to produce upon reaction a total of from 0.02 to 6 percent based on the polymer particles of water and carbon dioxide.

The available expandable polymer beads, although adequate for a great majority of applications involving expansion, have three shortcomings, which prevent an even wider use than they currently enjoy. A major disadvantage is that when the blowing agent adjnuct is added externally to the pellets, a portion of it tends during long-term extrusion runs to deposit out on the extruder screw: the amount deposited being proportional to the duration of the runs. Such deposits cut down the efficiency of the extrusion operation and may be severe enough to require periodic shutdowns to clean the screw.

Another disadvantage is that the blowing agent adjunct must be added to and mixed with the beads shortly prior to their use in order to prevent or minimize the separation of blowing agent adjunct and insure an adequate mixture, which is a necessity if a homogeneous foam is to be produced. If the mixture is not homogeneous then the resulting extruded products may vary from unit to unit in apparent density. Accordingly, when the blowing agent adjunct is added shortly before extrusion there is presented the additional drawback that the addition of the adjunct is generally under plant conditions, thereby increasing the opportunity for contamination. Any of these conditions could result in the production of off-grade scrap material.

The foregoing difficulties and disadvantages can be overcome by a composition which is a mixture of two types of polymer particles: one type comprises the polymer with the acid incorporated therein and the other comprises the polymer with the carbon dioxide liberating agent, e.g. sodium bicarbonate, incorporated therein. The composition of each particle is unchanged by any handling between manufacture and molding, and there is substantially no opportunity for the adjunct to deposit on the extruder screw. During the extrusion or injection molding operation when the particles are made into useful articles, the polymer becomes fluid at the temperatures and pressures of the operation, the components of the adjunct, the acid and sodium bicarbonate, become mixed and react to form water and carbon dioxide, thus providing a foam structure for the finished article.

It has now been found that an expandable polymer particularly suited for further fabrication by injection molding or extrusion may be prepared by intimately and uniformly incorporating in a screw extruder one component of a multi-component blowing agent with a portion of polymer and thereafter quenching the portion. This portion of particles is mixed with another portion of particles which have been prepared in the same manner but which have incorporated therein a second component of the multi-component blowing agent. The resulting particles containing the blowing agent components preferably, but not necessarily, contain a normally liquid blowing agent, that is incorporated into the polymer particles before or simultaneously with the addition to the polymer of the adjunct component.

In accordance with this invention expandable particles containing a normally liquid blowing agent and one component of a multi-component blowing agent, may be produced by incorporating one component of a multi-component blowing agent and a normally liquid blowing agent in the polymer particles which contain no normally liquid blowing agent. This may be accomplished conveniently by mixing the blowing agent component with the polymer particles prior to their introduction into a screw extruder in a manner hereinafter described. Alternately, the blowing agent component may be mixed with the normally liquid blowing agent and the mixture injected into the polymer in the screw extruder. In order to insure that the solid blowing agent adjunct stays in suspension in the liquid blowing agent, a minor amount of a suspending agent such as a non-ionic detergent or lithium or calcium soap should be added to the liquid.

The single sheet of drawing is a diagrammatic representation of the practice of the invention and is for purposes of illustration only.

Polymeric particles 2, alone or in combination with a blowing agent adjunct, are placed in the hopper 4 of extrusion machine 6. The polymeric particles 2 are fed from the hopper 4 to the extruder screw (not shown) which is contained in the barrel 8 of the extruder 6. The screw is driven by a thust bearing which in turn is driven by a flexible coupling which is driven by gear reducer, all of which are located in housing 7 and are driven by motor 9.

The blowing agent is stored in tank 10 from whence it is pumped by constant pressure pump 11 through line 12 to line 13 where it is injected into the barrel of the extruder wherein the normally liquid blowing agent becomes initimately mixed with the extruding plastic. The mixture of blowing agent and plastic exits from the extruder through multiple orifice die 15 in the form of strands 16. The die 15 is immersed in water bath 17. The strands 16 are kept immersed in bath 17 by rollers 19 and 20. The strands 16 are then fed to a chopper 25 where they are pelletized and then packaged in a suitable container such as a drum 26. These pellets may then be stored prior to further processing.

A preferred form of the compositions of this invention contemplates a mixture of polymeric particles, having an aliphatic hydrocarbon boiling in the range of about 20–40° C., and one portion of which contains an alkali or alkaline earth carbonate or bicarbonate and another portion of which contains boric acid or an organic acid having about ten milli-equivalents of acidic hydrogen per gram, so that the particles contain, upon reaction in a molding operation, water and carbon dioxide to provide a foam structure.

Excellent results are obtained utilizing as a component oxalic or citric acid, the latter being preferred from a toxicity standpoint. Other suitable acids are, for example, malonic, maleic, fumaric, succinic, itaconic, citraconic, malic, adipic, formic, acetic, propionic, tartaric, phthalic, butyric, lactic, chloroacetic and diglycollic, all of which have at least 10 milli-equivalents of acidic hydrogen per gram. Several of the foregoing solid acids are available in the form of their hydrates which can be used herein. The water present in the hydrated form of the acid is to be taken into consideration in computing the amount of water and carbon dioxide produced upon reaction.

Other acids which yield desirable results are, for example, stearic, oleic, caprylic, enanthic, benzoic, caproic, benzene sulfonic, toluene sulfonic and valeric acids.

It is to be noted that acid salts having available acidic hydrogen can be utilized for reaction with carbon dioxide liberating agents in place of the above referred to organic acids. Potassium acid tartrate is illustrative of acid salts which can be utilized.

These acids, when utilized in the above set forth quantities, yield compositions which upon further expansion, produce polystyrene having substantially uniform small voids and a density less than about five pounds per cubic foot, which density is particularly desirable in commercial products.

The preferred carbon dioxide liberating agents used herein as the second component are the carbonates and bicarbonates of the alkali and alkaline earth compounds, as, for example, lithium, sodium, potassium, calcium, strontium, barium, and ammonium. Excellent results are obtained by the use of sodium bicarbonate, but it will be realized that the carbonates and bicarbonates of other alkali or alkaline earth metals can be utilized herein. The criterion of acceptability for a carbon dioxide liberating agent useful herein is the ability of such agent to react with the afore-mentioned acids at suitable extruder temperatures to yield water and carbon dioxide.

The normally liquid blowing agents include aliphatic hydrocarbons boiling in the range of approximately 20–100° C. and mixtures thereof with volatile solvents in such amounts that the resulting mixture is not a solvent for the polymer. The use of normally liquid blowing agents in amounts of up to 15 parts per 100 parts of beads, that is, polymer plus expanding agent, yield particularly desirable expanded polymeric structures. Particularly good results are obtained in the range of about 4–7 parts of blowing agent but greater or lesser amounts may be used, depending upon the use to which the resulting particles will be put.

In general, the requisites for the liquid blowing agent useful in this invention are that it be capable of being integrated with the particular polymeric material during extrusion without altering the characteristics of the polymer. Further, the expanding agent should have a high volatility, that is, that it boil somewhat below the incipient softening point of the particular polymeric material in connection with which it is to be used. Aliphatic hydrocarbons boiling below the incipient softening point of the polymer with which they are to be used are useful in the process of this invention.

It has been found that petroleum ethers and certain ligroines give excellent results when used as the liquid blowing agents in a process of this invention, particularly in connection with vinyl aryl polymers, especially polystyrene. Liquid blowing agents boiling in the range 20–100° C. are useful. Excellent results are obtained with agents boiling in the range of 25–65° C. denoted as "pentane" fraction. Other examples of normally liquid blowing agents useful herein are the petroleum ethers boiling in the range 65–72° C. denoted as the "hexane" fraction and the petroleum ethers boiling in the range 95–100° C. denoted as the "heptane" fraction. Similarly useful are the pure hydrocarbons boiling in the range 25–100° C. such as, for example, pentane, hexane, heptane, cyclopentane, cyclopentadiene, etc. although it is preferred for reasons of economy to utilize mixtures of such hydrocarbons as petroleum ethers. Other suitable blowing agents are acetone, methyl alcohol, methyl acetate, ethyl acetate, methyl formate, ethyl formate, dichloroethylene, isopropyl chloride, propionaldehyde, dipropylether, methylchloride, dichloroethane, dichlorodifluoromethane and similar low boiling halogenated alkanes.

The extruder, with the exception of provision for injection of the blowing agent if desired, is of conventional design, such as those described in Chapter 4 of "Processing of Thermoplastic Materials" edited by E. C. Barnhardt, 1959. Depending upon screw design and the feed system of the particular extruder there may have to be made provision for preventing the feed-back of hydrocarbon if it is used, since if hydrocarbon feeds back to the hopper it condenses out on the beads, causing them to cake.

It will be realized that the temperature at which the extruder is maintained is dependent upon such variables as the rate of extrusion and the nature of the particular polymer being extruded. It has been found that, in general, extrusion temperatures in the range of from about 200–375° F. are satisfactory using the above described compositions of this invention. However, extruder temperatures in the range of approximately 450° F. can be utilized providing the rate of extrusion is increased accordingly.

In the instances where the polymer particles contain a normally liquid blowing agent expansion is prevented by quenching the extrudate as it leaves the die. By quenching is meant the cooling of the extrudate at a rapid rate to a temperature where the stiffness modulus of the extrudate is great enough to resist dimensional change caused by the force exerted by the internal vapor pressure of the hydrocarbon. The quenching should immediately follow the extrusion without permitting any substantial expansion to occur. The quenching may be accomplished in any convenient manner, such as by extruding directly into a water bath or by using insulated cooled dies through which refrigerants are circulated.

A particularly desirable composition of this invention contemplates the utilization of polymeric particles having an aliphatic hydrocarbon boiling in the range of about 25–50° C. such as isopentane, an alkali carbonate or bicarbonate such as sodium bicarbonate, and an organic acid having at least ten milli-equivalents of an acidic hydrogen per gram, such as citric acid.

The following examples further illustrate the practice of this invention.

EXAMPLE I

Polystyrene beads in an amount of 50 lbs. were added to a drum blender to which was added 0.5% by weight (0.25 lb.) of sodium bicarbonate. The blender was started and run five minutes, stopped, and the resulting mixture removed from the blender. This mixture of sodium bicarbonate and polystyrene was then added to the hopper of a 1½ inch National Rubber Machinery extruder with a length to diameter ratio of 20:1, fitted with a die which contained thirteen 1/16 inch diameter orifices. The extruder was run using a rear cylinder temperature of 250° F., a front cylinder temperature of 280° F., a die temperature of 300° F. and a screw speed of 67 r.p.m. The die was adapted at a right angle to the extruder to extrude directly into a water bath. The water bath contained water which was recirculated at a temperature between 45–55° F. Upon leaving the water bath the resulting strands were fed into a chopper which was set to chop the strands into 1/16 inch lengths.

EXAMPLE II

Example I was repeated except that there was substituted for the sodium bicarbonate used therein 0.4% by weight (0.20 lb.) of citric acid.

EXAMPLE III

A 10 pound portion of each of the groups of pellets produced in Examples I and II were blended together and extruded. The same 1½ inch National Rubber Machinery Corporation 20:1 L/D ratio extruder was used. However, the die used was a ¼ inch orifice rod die. The resulting rod was found to have a density of about 46 pounds per cubic foot. The rod was solid white and had slight cell formation, the cells being closed.

EXAMPLE IV

Example I was repeated except that there was substituted for the polystyrene used therein polystyrene pellets sold under the trademark "Dylite" which contained 6.45% by weight of normal pentane. The pellets were slightly opaque and contained voids.

EXAMPLE V

Example II was repeated except that there was substituted for the polystyrene used therein polystyrene beads sold under the trademark "Dylite" which contained 6.45% by weight of normal pentane. The pellets were slightly opaque and contained voids.

EXAMPLE VI

Ten pound portions of the pellets produced in Examples IV and V were blended and then extruded in the above described 1½ inch National Rubber Machinery extruder. The conditions of extrusion were a rear cylinder temperature of 200° F., a front cylinder temperature of 265° F. and a die temperature of 250° F. The output rate was 28 pounds per hour and the resulting rod was white and had a density of 4.10 pounds per cubic foot. The rod had a very fine, even cell structure, with a few voids.

EXAMPLE VII

A series of samples were made using polystyrene beads (Dylite) containing 6.45 percent by weight of normal pentane. In each case 50 pounds of the beads were mixed in a drum tumbler with the indicated amount of additive. The samples, designated 1–5, were prepared by extruding the mixtures of polystyrene which contained pentane and the additives in the previously described 1½ inch National Rubber Machinery extruder, which was equipped with a thirteen orifice 1/16 inch diameter strand die. The rear cylinder temperature was 215° F., the front cylinder temperature was 300° F., the die temperature 300° F. and the water bath temperature 50° F. A screw speed of 67 r.p.m. was used. After emerging from the water bath the strands were chopped in a pelletizer into 1/16 inch lengths.

TABLE I.—PRODUCTION OF QUENCH PELLETS

| Run No. | Feedstock Formulation | Length of Run | Output Rate Lbs./Hr. | | Screw Speed, r.p.m. |
|---|---|---|---|---|---|
| | | | High | Low | |
| 1 | Beads+0.5% sodium bicarbonate. | 2 hours | 50.6 | 48.8 | 67 |
| 2 | Beads+1.0% sodium bicarbonate. | do | 52.2 | 48.2 | 67 |
| 3 | Beads+0.4% citric acid. | 2 hours—35 min. | 40.9 | 38.3 | 67 |
| 4 | Beads+0.8% citric acid. | 2 hours—20 min. | 44.6 | 43.5 | 67 |
| 5 | Beads+1.2% citric acid. | do | 43.6 | 41.9 | 67 |

TABLE II.—TUBULAR FILM EXTRUSION

| Run No. | Sample Composition Pellet Mixture | Output Rate, lbs./hr. | Film Density, lbs./cu. ft. | Rod Density, lbs./cu. ft. |
|---|---|---|---|---|
| A | 15 lbs. (3-0.4% citric acid)<br>15 lbs. (1-0.5% sodium bicarbonate) | 39.2 | 4.3 | 3.56 |
| | 15 lbs. (3-0.4% citric acid)<br>15 lbs. (1-0.5% sodium bicarbonate) | 38.5 | | |
| B | 15 lbs. (4-0.8% citric acid)<br>15 lbs. (1-0.5% sodium bicarbonate) | 38.7 | 4.3 | 3.56 |
| | 15 lbs. (4-0.8% citric acid)<br>15 lbs. (1-0.5% sodium bicarbonate) | 39.8 | | |
| C | 15 lbs. (5-1.2% citric acid)<br>15 lbs. (2-0.5% sodium bicarbonate) | 41.8 | | |
| | 15 lbs. (5-1.2% citric acid)<br>15 lbs. (2-0.5% sodium bicarbonate) | 41.7 | 4.4 | 3.69 |
| D | 15 lbs. (3-0.4% citric acid)<br>15 lbs. (2-1.0% sodium bicarbonate) | 38.3 | | |
| | 15 lbs. (3-4.0% citric acid)<br>15 lbs. (2-1.0% sodium bicarbonate) | 38.3 | 5.0 | 3.44 |
| E | 15 lbs. (4-0.8% citric acid)<br>15 lbs. (2-1.0% sodium bicarbonate) | 36.5 | | |
| | 15 lbs. (4-0.8% citric acid)<br>15 lbs. (2-1.0% sodium bicarbonate) | 36.4 | 4.6 | 3.71 |
| F | 15 lbs. (5-1.2% citric acid)<br>15 lbs. (1-1.0% sodium bicarbonate) | 38.3 | 4.7 | 3.56 |
| | 15 lbs. (5-1.2% citric acid)<br>15 lbs. (1-1.0% sodium bicarbonate) | 38.3 | | |

Bead samples 1–5 were then blended as indicated in Table II above to give a series of samples designated as A–F. Each of the samples A–F was then divided into two parts. One part was extruded as film and the other as rod. The extrusion conditions for the film were a rear cylinder temperature of 200° F., a front cylinder temperature of 255° F. and a die temperature of 250° F. The results are indicated in Table II above. The other portion of the material was extruded as rod, using a rear cylinder temperature of 205° F., a front cylinder temperature of 220° F., and a die temperature of 220° F. and a bath temperature of 48° F. The density of the resulting rod is indicated in Table II above.

It may be observed that the amount of reactant used may vary from stoichiometric amounts without ill effect. However, stoichiometric quantities are most advantageous from an economic point of view.

EXAMPLE VIII

Polystyrene particles in the form of beads having an average size such that they pass a 20 mesh screen, and sodium bicarbonate in an amount of 2% by weight of the beads, was mixed in a rubber blender and then the mixture was charged to the hopper of an extruder having a length to diameter ratio of 20:1, the barrel being 1.5 inches in diameter. The extruder was fitted with an orifice die which was constructed so that the extrudate exited as thirteen 1/16 inch strands. The die was so mounted that the strands fed directly into a water bath which was maintained at a temperature of 40–50° F. The barrel of the extruder was fitted with a metering pump which was adjusted to supply sufficient n-pentane so that the extrudate contained 7% by weight of pentane. From the water bath the strands were led to a chopper where they are cut in 1/16 inch lengths. The extruder was started and run for one quarter hour and produced eleven pounds of pellets.

EXAMPLE IX

The procedure of Example VIII was repeated except that citric acid was substituted for the sodium bicarbonate.

EXAMPLE X

The two batches of beads of Examples VIII and IX were mixed in equal portions and extruded in a National Rubber Machinery 1.5 inch extruder at a die temperature of 250° F., a front cylinder temperature of 250° F., and a rear cylinder temperature of 210° F. in the form of a tube using the blown film technique, which had a density of 3.8 pounds per cubic foot. The film had an even, small, closed cell structure.

EXAMPLE XI

The procedure of Example I was repeated except that there was substituted for the polystyrene used therein polystyrene pellets (Dylite) which contained 6.54% isopentane, and for the sodium bicarbonate used therein sodium carbonate.

EXAMPLE XII

The procedure of Example I was repeated except that there was substituted for the polystyrene used therein polystyrene pellets (Dylite) which contained 6.00% of n-pentane and for the sodium bicarbonate there was substituted stearic acid.

EXAMPLE XIII

Three pound portions of the pellets produced in Examples XI and XII were blended together with a dye in a ribbon blender, and were thereafter extruded in the previously described National Rubber Machinery 1.5 inch extruder. The rod was substantially similar to that obtained in Example VI and was evenly colored.

It is noted that in addition to dyes other substances such as fillers may be added to the polymer without deleterious effect. The addition may also be made when a component of the blowing agent is added.

EXAMPLE XIV

A portion of pellets produced according to the procedure of Example I was blended with a portion of pellets produced according to the procedure of Example V and extruded in sheet form according to the process of Example X. The sheet was flexible and had a soft texture.

EXAMPLE XV

A portion of pellets produced according to the procedure of Example II was blended with a portion produced according to Example IV. The mixture was extruded to give a rod of fine cell size.

In addition to polystyrene other thermoplastic resins may be used in the practice of this invention. For example, copolymers of styrene and other monomers copolymerizable therewith, e.g. alpha methylstyrene, acrylonitrile, etc. may be used. Other polymers such as cellulose acetate, polyvinyl acetate, polyvinyl chloride and nylon may be used.

The advantages of the material of this invention over that heretofore available are many. In addition to those advantages already set forth above other advantages are that it is possible to obtain the particles in many different shapes, such as cylinders and cubes. This is most advantageous when compared to the previously available globe-like shapes which gave trouble in extrusion in that they tended to slip by the screw. In contrast the shapes now available can be tailored to give the ultimate degree of extrusion with any particular extruder.

Another advantage is the wide range of compositions which the fabricator has at his disposal. There is thus a best composition for any particular end product desired. The blowing agent content may vary to up to about 10% by weight and the carbon dioxide and water content by correct choice of reactants may be made to vary from about 0.2 to 6% by weight. Within this range there will be a particular composition best suited for any end product and fabricating method.

The above expandable polymer is obviously a great improvement over that heretofore available, and is a major step forward in the art.

I claim:

1. A storage stable expandable polymeric composition comprising a mixture of first and second portions of *thermoplastic* polymeric particles, said first portion of polymeric particles having incorporated therein a normally liquid aliphatic hydrocarbon boiling in the range of from 20° C. to 100° C. and a carbon dioxide liberating agent selected from the group consisting of carbonates and bicarbonates of the alkali metals and alkaline earth metals, said second portion of polymeric particles having incorporated therein a normally liquid aliphatic hydrocarbon boiling in the range of from 20° C. to 100° C. and an acid selected from the group consisting of boric acid and solid organic acids having at least 10 milli-equivalents of acidic hydrogen per gram, the total amount of said hydrocarbon contained in said composition being between 2% and 15% by weight of the total composition and the amount of carbon dioxide liberating agent in said first portion of polymeric particles and the amount of acid in said second portion of polymeric particles being such that, upon complete reaction of said carbon dioxide liberating agent and acid, there will be formed water and carbon dioxide in an amount between 0.2% and 6% by weight of said polymeric composition.

2. A storage stable expandable polystyrene composition comprising a mixture of first and second portions of polystyrene particles, said first portion of polystyrene particles having incorporated therein pentane and sodium bicarbonate, said second portion of polystyrene particles having incorporated therein pentane and citric acid, the total amount of said pentane contained in said composition being between 4% and 8% by weight of the total composition and the amount of sodium bicarbonate in said first portion of polystyrene particles and the amount of citric acid in said second portion of polystyrene particles being such that, upon complete reaction of said citric acid and said sodium bicarbonate, there will be formed water and carbon dioxide in an amount between 0.2% and 6% by weight of said polystyrene composition.

3. A storage stable expandable polymeric composition comprising a plurality of *thermoplastic* polymeric particles each particle having incorporated therein a normally liquid aliphatic hydrocarbon boiling in the range of from 20° C. to 100° C. and an acid selected from the group consisting of boric acid and organic acids having at least 10 milli-equivalents of acidic hydrogen per gram, said particles being physically admixed with a carbon dioxide liberating agent selected from the group consisting of carbonates and bicarbonates of the alkali metals and alkaline earth metals, the total amount of said hydrocarbon contained in said composition being between 2% and 15% by weight of the total composition and the amount of carbon dioxide liberating agent and the amount of acid being such that, upon complete reaction of said acid and said carbon dioxide liberating agent, there will be formed water and carbon dioxide in an amount between 0.2% and 6% by weight of said polymeric composition.

4. A process for producing an expandable thermoplastic resin mixture comprising heating in the cylinder of a screw extruder a first batch of thermoplastic resin to a temperature between 200° F. and 375° F. to obtain a molten mass, incorporating within said mass an aliphatic hydrocarbon boiling in the range from 20° C. to 100° C. and at least 0.5% by weight of said mass of a carbon dioxide liberating agent selected from the group consisting of carbonates and bicarbonates of the alkali metals and alkaline earth metals, forcing said molten mass from said cylinder through the extruder die directly into a cooling bath to cool the mass of resin to a temperature below the softening point of said resin before foaming occurs, recovering the cooled resin, heating in the cylinder of a screw extruder a second batch of a thermoplastic resin to a temperature between 200° F. and 375° F. to obtain a second molten mass, incorporating within said second mass an aliphatic hydrocarbon boiling in the range from 20° C. to 100° C. and at least 0.4% by weight of said mass of an acid selected from the group consisting of boric acid and organic acids having at least 10 milli-equivalents of acidic hydrogen per gram, forcing said second molten mass from said cylinder through the extruder die directly into a cooling bath to cool the mass of resin to a temperature below the softening temperature of said resin before foaming occurs, recovering the second cooled resin, and thereafter mixing said first and second cooled resins in a ratio such that the resulting mixture will contain from about 4 to 12% by weight of said hydrocarbon and, upon reaction of said acid and said carbon dioxide liberating agent, there will be produced a total of from 0.2 to 6% by weight of said resin of water and carbon dioxide.

5. A process for producing an expandable polystyrene comprising heating in the cylinder of a screw extruder a first batch of polystyrene to a temperature between 200° F. and 375° F. to obtain a molten mass, incorporating within said mass pentane and at least 0.5% by weight of said mass of sodium bicarbonate, forcing said molten mass from said cylinder through the extruder die directly into a cooling bath to cool the mass to a temperature below the softening point of said polystyrene before foaming occurs, recovering the cooled polystyrene, heating in the cylinder of a screw extruder a second batch of polystyrene to a temperature between 200° F. and 375° F. to obtain a second molten mass, incorporating within said second mass pentane and at least 0.4% by weight of citric acid, forcing said second mass from said cylinder through the extruder die directly into a cooling bath to cool the mass of polystyrene to a temperature below the softening temperature of said polystyrene before foaming occurs, recovering the second cooled polystyrene, and thereafter mixing said first and second cooled polystyrenes in a ratio such that the resulting mixture will contain from about 4 to 12% by weight of pentane and, upon reaction of said citric acid and said sodium bicarbonate, there will be produced a total of from 0.2 to 6% by weight of said polystyrene of water and carbon dioxide.

6. A storage stable expandable thermoplastic composition consisting essentially of polystyrene particles, having homogeneously incorporated therein [from 4 to 8 parts of a normally liquid] *an* aliphatic [hydrocarbon] blowing agent [boiling in the range of from 20 to 100° C.], said particles being in combination with a blowing agent adjunct comprised of two components, a normally solid acid selected from the group consisting of boric acid and organic acids having at least 3 milli-equivalents of acidic hydrogen per gram, and a carbon dioxide liberating agent selected from the group consisting of carbonates and bicarbonates of the alkali metals and alkaline earth metals, only one of said components of said blowing agent adjunct being homogeneously incorporated in any single one of said polystyrene particles.

References Cited

The following references cited by the Examiner, are of record in the patented file of this patent or the original patent.

UNITED STATES PATENTS 2,941,964 6/1960 Houston et al. ------- 260—2.5

MURRAY TILLMAN, *Primary Examiner.*

JOHN C. BLEUTGE, *Assistant Examiner.*